Aug. 25, 1959 M. YAVITCH Re. 24,690

DEVICE FOR TESTING BATH CABINET SHOWER PANS FOR LEAKAGE

Original Filed Nov. 5, 1945

INVENTOR:
Morris Yavitch,
BY
Alan Franklin,
ATTORNEY.

United States Patent Office

Re. 24,690
Reissued Aug. 25, 1959

24,690

DEVICE FOR TESTING BATH CABINET SHOWER PANS FOR LEAKAGE

Morris Yavitch, Los Angeles, Calif.

Original No. 2,780,303, dated February 5, 1957, Serial No. 235,690, July 9, 1951, which is a continuation of Serial No. 626,662, November 5, 1945. Application for reissue June 2, 1958, Serial No. 739,441

3 Claims. (Cl. 4—288)

Matter enclosed in heavy brackets [ ] appears in the original patent but forms no part of this reissue specification; matter printed in italics indicates the additions made by reissue.

This invention relates to shower bath cabinets, and more particularly to a device for testing bath cabinet shower pans for leakage. This application is a substitute application for, and a continuation of my application, Serial No. 626,662, filed November 5, 1945, for Shower Drain, since abandoned.

The general object of the invention is to provide an improved device for testing the shower pan of a shower bath cabinet for leakage, whereby said shower pan may be more easily, effectively and satisfactorily tested than with the conventional testing devices used for such testing.

A more particular object is to provide a testing device of the character stated, by means of which a test pipe may be connected to the drain outlet of a shower bath cabinet for testing the shower pan of said cabinet for leakage, thus eliminating the use of the inefficient and unsatisfactory conventional rubber test plug and the closing of the outlet drain pipe with cement, for such testing, and providing a much superior testing device for the purpose stated.

Another object is to provide a testing device of the character stated, in which the inlet drain receptacle is larger than its drain outlet nipple to provide more room in the drain for receiving a test pipe and for cleaning the drain.

A further object is to provide a shower drain which will eliminate the threaded connection and grill screws and the objectionable rusting of the drain nipple and said screws of the conventional drain.

Other objects and advantages will appear hereinafter as this specification progresses.

The invention is illustrated in the annexed drawing, which forms a part of this specification, and in which.

Figure 1:
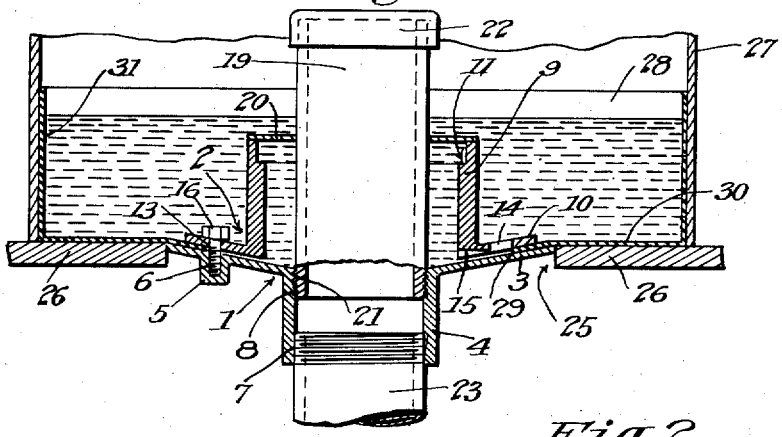
Fig. 1 is a vertical longitudinal section of my shower drain taken on line 1—1 of Fig. 3 with the grill removed and a test pipe connected thereto for testing the same for leakage.

Referring more particularly to the drawing, in which corresponding parts are designated by the same reference numerals in all of the figures, the shower drain of my invention includes a lower base member 1, and an upper clamp member 2.

Said lower base member 1 is formed with a slightly-inclined annular funnel-shaped base wall 3 and a drain outlet nipple 4 depending centrally from said base wall. In said base wall 3 are formed a plurality, preferably three, sockets 5 spaced equidistant apart around said wall, the openings of which sockets extend downwardly from the upper side of said base wall and are threaded as indicated at 6. In the lower end of the outlet nipple 4 is provided an internal thread 7, while in the upper end of said nipple is provided an internal thread 8.

The upper clamp member 2 comprises a vertical cylindrical drain inlet receptacle 9 formed at its lower end with an external annular flange base 10, which is inclined slightly upwardly and outwardly from said inlet drain receptacle at the same inclination as the base wall 3 of the lower base member 1, while in the upper end of said drain receptacle is formed an internal rabbet 11 in which is detachably retained a grill 12. The inlet receptacle 9 is substantially larger in diameter than the diameter of the outlet nipple 4 of the lower base member 1. The flange base 10 is provided with a plurality of bolt holes 13, preferably three, and a plurality of weep holes 14, preferably three, which bolt holes are spaced equidistant apart and which weep holes are likewise spaced around said flange base, with said weep holes positioned midway between said bolt holes. In the lower side of the flange base 10 are formed a plurality of radial grooves 15 leading inwardly, respectively, from the weep holes 14 into the lower end of the drain receptacle 9. The bolt holes 13 in the flange base 10 are positioned to register with the threaded sockets 5, respectively, to receive bolts 16 threaded in said sockets.

Figure 2:
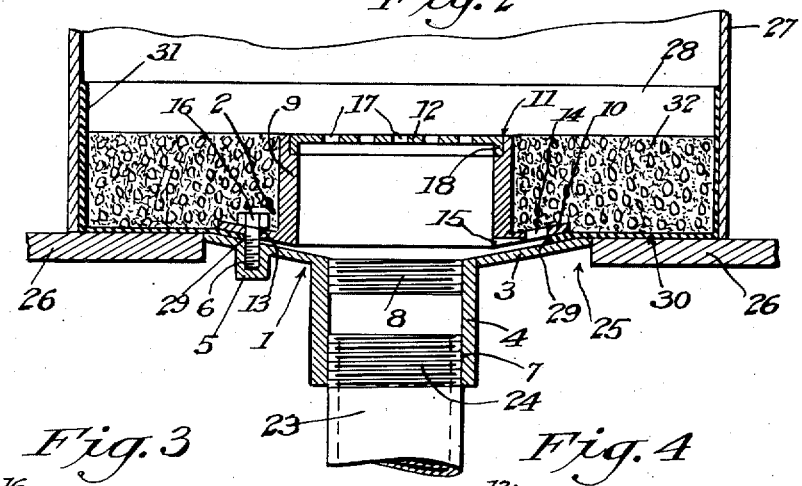
Fig. 2 is a view like Fig. 1 of my shower drain after it has been tested and the test pipe has been removed, and showing the grill placed in position in the upper end of the drain.
Figure 3:
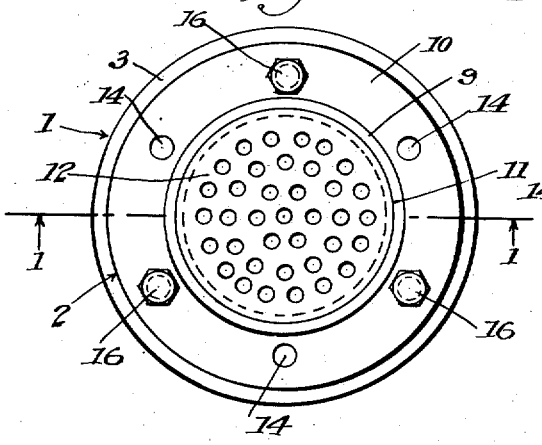
Fig. 3 is a top plan view of my shower drain.
Figure 4:
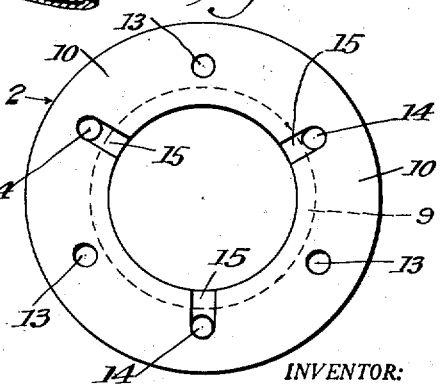
Fig. 4 is a bottom plan view of the upper member of my shower drain.

The grill 12 is provided with a plurality of drain openings 17 and is formed at its periphery with a depending annular flange 18, which detachably fits closely within the annular rabbet 11 in the upper end of the drain receptacle 9, with the lower edge of said flange resting upon the lower edge of said rabbet and supporting the grill 12 in the upper end of said drain receptacle, with the upper surface of said grill flush with the upper edge of said receptacle, as shown in Fig. 2 of the drawing.

A test pipe 19 is employed for testing the shower pan of my shower bath cabinet for leakage, in the manner hereinafter more fully described. On said test pipe is slidably fitted a flat collar 20, and on the lower end of said test pipe is formed an external thread 21, while on the upper end of said test pipe is detachably fitted a cap 22.

The operation of my invention is as follows:

The lower end of the drain outlet nipple 4 of the drain base member 1 is threaded on the upper end of a drain pipe 23 with the internal thread 7 in the lower end of said nipple engaging the external thread 24 on the upper end of said drain pipe, and the drain base member 1 is positioned within an opening 25 in the floor 26 under a bath cabinet 27, with the upper outer edge of the base wall 3 of said base member flush with the upper surface of said floor 26 at the upper edge of said opening 25 in said floor. A shower pan 28 of lead, copper or paper coated with tar, provided with a central opening 29 in its bottom wall 30 is placed with its said bottom wall upon the floor 26 and over the outer edge and upon the outer portion of the base wall 3 of the base member 1, with the center of said opening 29 coinciding with the center of the nipple 4 of said base member. The side walls 31 of the pan 28 extend upwardly above the level of the upper edge of the drain inlet receptacle 9. The clamp member 2 is placed over the base member 1 with the outer portion of its flange base 10 resting upon the bottom wall 30 of the shower pan 28 over the edge of the opening 29 in said bottom wall and with the bolt holes 13 in said flange base coinciding with the threaded bolt sockets 5. The bolts 16 are then respectively introduced through the coinciding bolt holes 13 and into the threaded bolt sockets 5, in the flange base 10 of the clamp member 2 and in the base wall 3 of the base member 1, respectively, and said bolts 16 are tightened in said threaded sockets until the heads of said bolts, engaging the flange base 10 of the clamp member 2, clamp the bottom wall 30 of the shower pan 28 at the edge portion of the opening 29 of said bottom wall tightly between the base wall 3 of the base member 1 and the flange base 10 of the clamp member 2.

The grill 12 being removed from the upper end of the inlet drain receptacle 9 the test pipe 19 is introduced into said receptacle and its lower end is threaded into the upper end of the drain outlet nipple 4 by the engagement of the thread 21 on the lower end of the test pipe with the thread 8 in the upper end of said nipple. The flat collar 20 is then moved down on the test pipe 19 upon the upper end of the drain inlet receptacle 9 closing said end of said receptacle. Water is then introduced into the shower pan 28, from which pan part of the water flows through the weep holes 14 and the grooves 15 in the flange base 10 into the lower end of the drain inlet receptacle 9 until the water fills said drain inlet receptacle and fills said shower pan 28 up to a level above the upper end of said drain inlet receptacle, as shown in Fig. 1; the lower end of the test pipe 19, threaded in the upper end of the drain outlet nipple 4, preventing the water from flowing out of the bottom of the drain receptacle 9 through said outlet nipple 4 and the drain pipe 23, and preventing the water from flowing out of the shower pan 28 through the weep holes 14, grooves 15, lower end of the inlet receptacle 9, outlet nipple 4 and drain pipe 23, also as shown in Fig. 1 of the drawing. If there is a leak in the shower pan 28 the water flowing through said leak will indicate its location under said pan and the bath cabinet 27, and upon unscrewing and removing the test pipe 19 from the nipple 4 and removing said test pipe from the outlet nipple 4 and the drain receptacle 9, the water will flow out of the shower pan 28 through the weep holes 14 and grooves 15 into the lower end of the drain inlet receptacle 9, and from said receptacle the water will flow out through the drain outlet nipple 4 and the drain pipe 23. The leak is then repaired and my bath cabinet then may be used, or the shower pan may again be tested until there is no leak in it.

While the shower pan 28 is being tested for leakage, the cap 22 may be removed from the upper end of the test pipe 19 and a hose inserted in the upper open end of said pipe and water introduced into said pipe from the hose to flush out the drain and the drain pipe.

When the shower pan 28 after being tested one or more times, contains no leak, the shower pan is filled with concrete 32 up to the level of the upper end of the inlet drain receptacle 9, which concrete forms the floor of the bath cabinet 27. While the concrete is placed in the shower pan the test pipe 19 remains in position in the drain inlet receptacle 9 and the outlet nipple 4, and the collar 20 remains in position covering the upper end of said inlet receptacle and prevents any of said concrete or dirt from entering said receptacle and the outlet nipple 4. The test pipe 19 being finally unscrewed from the upper end of the nipple 4 and removed from said nipple and the drain receptacle 9, the grill 12 is then placed in the upper end of the drain inlet receptacle 9 with its side wall 18 fitted in the rabbet 11 in said receptacle and with the upper surface of said grill 12 flush with the upper surface of the concrete floor 32.

In the use of the bath cabinet, water from the shower falling upon the concrete floor 32 and the grill 12, is drained out of the bath cabinet through the openings 17 in the grill and through the drain inlet receptacle 9, drain outlet nipple 4 and drain pipe 23.

My testing device provides for a more effective and satisfactory test for leakage in the shower pan than other testing devices now in use.

I claim:

1. The combination of a shower drain including a base member formed with an outlet nipple to which a drain pipe may be connected, a shower pan provided with a central opening, said shower pan being placed upon said base member with the opening therein coinciding centrally with said outlet nipple, a clamp member formed with an integral flange base and a drain inlet receptacle upstanding from said flange base, said receptacle being substantially larger in diameter than said outlet nipple, said clamp member being placed with its flange base resting upon the bottom wall of said shower pan, means for securing said flange base and the bottom wall of said shower pan to said base member, said clamp member being provided with drain outlet means leading from the exterior of the lower end of said drain inlet receptacle into the lower end of said receptacle, an open-ended tubular test pipe, means for removably securing the lower end of said test pipe to said outlet nipple, the other end of said open-ended test pipe extending through and above said drain inlet receptacle, and a collar slidably fitted on the test pipe for covering the upper end of the drain inlet receptacle, whereby the shower pan can be tested for leaks and the plumbing below the shower pan can be simultaneously flushed.

2. The combination as set forth in claim 1 and in addition thereto a removable cap, means for securing said cap to said other end of said open-ended test pipe, whereby the shower pan can be tested for leaks and the plumbing below the shower pan can be simultaneously tested for leaks.

*3. The combination of a shower drain including a base member formed with an outlet nipple to which a drain pipe may be connected, a shower pan provided with a central opening, said shower pan being placed upon said base member with the opening therein coinciding centrally with said outlet nipple, a clamp member formed with an integral flange base and a drain inlet receptacle upstanding from said flange base, said receptacle being substantially larger in diameter than said outlet nipple, said clamp member being placed with its flange base resting upon the bottom wall of said shower pan, means for securing said flange base and the bottom wall of said shower pan to said base member, said clamp member being provided with drain outlet means leading from the exterior of the lower end of said drain inlet receptacle into the lower end of said receptacle, and an open-ended tubular test pipe, means for removably securing the lower end of said test pipe to said outlet nipple, the other end of said open-ended test pipe extending through and above said drain inlet receptacle whereby the shower pan can be tested for leaks and the plumbing below the shower pan can be simultaneously flushed.*

References Cited in the file of this patent or the original patent

UNITED STATES PATENTS

| | | |
|---|---|---|
| 1,749,878 | Fleming | Mar. 11, 1930 |
| 1,766,621 | Fleming | June 24, 1930 |
| 1,808,411 | Hinkston | June 2, 1931 |
| 1,828,601 | Frye | Oct. 20, 1931 |
| 1,914,780 | Lichamer | June 20, 1933 |
| 1,941,537 | Boosey | Jan. 2, 1934 |
| 2,222,807 | Burr | Nov. 26, 1940 |
| 2,299,705 | Svirsky | Oct. 20, 1942 |